(12) United States Patent
Cheng et al.

(10) Patent No.: US 9,495,339 B2
(45) Date of Patent: Nov. 15, 2016

(54) METHOD AND APPARATUS FOR DISPLAYING INFORMATION IN A BROWSER

(71) Applicant: TENCENT TECHNOLOGY (SHENZHEN) COMPANY LIMITED, Shenzhen (CN)

(72) Inventors: Jun Cheng, Shenzhen (CN); Wei Wei, Shenzhen (CN); Jingyao Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 412 days.

(21) Appl. No.: 14/100,366

(22) Filed: Dec. 9, 2013

(65) Prior Publication Data

US 2014/0095967 A1   Apr. 3, 2014

Related U.S. Application Data

(63) Continuation of application No. PCT/CN2013/082418, filed on Aug. 28, 2013.

(30) Foreign Application Priority Data

Aug. 30, 2012   (CN) .......................... 2012 1 0314779

(51) Int. Cl.
  *G06F 17/22* (2006.01)
  *G06F 17/30* (2006.01)

(52) U.S. Cl.
  CPC ....... *G06F 17/2247* (2013.01); *G06F 17/2235* (2013.01); *G06F 17/30884* (2013.01)

(58) Field of Classification Search
  CPC .............. G06F 17/2235; G06F 17/2247; G06F 17/30902; G06F 17/30884; G06F
  (Continued)

(56) References Cited

U.S. PATENT DOCUMENTS

| 6,041,360 A | * | 3/2000 | Himmel ............ G06F 17/30884 707/999.001 |
| 6,633,316 B1 | * | 10/2003 | Maddalozzo, Jr. ..................... G06F 17/30899 707/E17.115 |

(Continued)

FOREIGN PATENT DOCUMENTS

| CN | 101377778 A | 3/2009 |
| CN | 101923544 A | 12/2010 |

(Continued)

OTHER PUBLICATIONS

The State Intellectual Property Office of the People's Republic of China (SIPO) Office Action 1 for 201210314779.5 Mar. 4, 2015.

(Continued)

*Primary Examiner* — Maikhanh Nguyen (74) *Attorney, Agent, or Firm* — Anova Law Group, PLLC (57) ABSTRACT

When a terminal receives a request for starting a browser, the terminal obtains quick links and web applications that are cached in local database of the terminal and displays the obtained quick links by combinations of webpage icons and webpage titles in a middle screen display interface of a start page of the browser for the requester. When receiving a request for switching display interfaces of the start page of the browser, the terminal displays a search box in the start page of the browser or the obtained web applications by combinations of application icons and application titles in the start page of the browser.

18 Claims, 7 Drawing Sheets

When a terminal receives a request for starting a browser, the terminal obtains quick links and web applications that are cached in local database and displays the obtained quick links by combinations of webpage icons and webpage titles in the middle screen of a start page of the browser — 101

When receiving a request for switching display interfaces of the start page of the browser, the terminal displays a searching box in the start page of the browser, or displays the obtained web applications by combinations of application icons and application titles — 102

(58) Field of Classification Search
CPC .............. 3/0481;G06F 3/0482; G06F 9/4443; G06F 3/04817
See application file for complete search history.

(56) References Cited

U.S. PATENT DOCUMENTS

| | | | | |
|---|---|---|---|---|
| 7,673,233 | B2* | 3/2010 | Moore | G06F 17/30899 715/243 |
| 8,214,768 | B2* | 7/2012 | Boule | G06F 3/04883 715/863 |
| 8,296,684 | B2* | 10/2012 | Duarte | G06F 3/0481 715/863 |
| 8,910,070 | B2* | 12/2014 | Goodger | G06F 17/30905 715/777 |
| 9,286,407 | B2* | 3/2016 | Curwen | G06F 17/30884 |
| 2007/0067733 | A1* | 3/2007 | Moore | G06F 17/30899 715/777 |
| 2008/0168401 | A1* | 7/2008 | Boule | G06F 3/04883 715/863 |
| 2008/0189658 | A1* | 8/2008 | Jeong | G06F 3/0482 715/810 |
| 2008/0301562 | A1* | 12/2008 | Berger | G06F 17/3089 715/733 |
| 2009/0249179 | A1* | 10/2009 | Shieh | G06F 17/30884 715/206 |
| 2010/0050067 | A1* | 2/2010 | Curwen | G06F 17/30884 715/206 |
| 2010/0070928 | A1* | 3/2010 | Goodger | G06F 17/30905 715/838 |
| 2010/0205559 | A1* | 8/2010 | Rose | G06F 3/0482 715/781 |
| 2011/0099508 | A1* | 4/2011 | Liu | G06F 9/4443 715/781 |
| 2011/0307810 | A1* | 12/2011 | Hilerio | G06F 3/0481 715/760 |
| 2013/0082974 | A1* | 4/2013 | Kerr | G06F 21/6245 345/174 |
| 2014/0282119 | A1* | 9/2014 | Wouhaybi | G06F 3/04883 715/760 |

FOREIGN PATENT DOCUMENTS

| | | |
|---|---|---|
| CN | 101980126 A | 2/2011 |
| CN | 102163198 A | 8/2011 |
| CN | 102184255 A | 9/2011 |
| CN | 102193949 A | 9/2011 |
| CN | 102411479 A | 4/2012 |
| CN | 102455857 A | 5/2012 |
| CN | 102622270 A | 8/2012 |
| EP | 2469425 A2 | 6/2012 |

OTHER PUBLICATIONS

The State Intellectual Property Office of the People's Republic of China (SIPO) Office Action 2 for 201210314779.5 Oct. 9, 2015.
The World Intellectual Property Organization (WIPO) International Search Report for PCT/CN2013/082418 Dec. 5, 2013.

* cited by examiner

METHOD AND APPARATUS FOR DISPLAYING INFORMATION IN A BROWSER

CROSS-REFERENCES TO RELATED APPLICATIONS

This application is a continuation application of PCT Patent Application No. PCT/CN2013/082418, filed on Aug. 28, 2013, which claims priority of Chinese Patent Application No. 201210314779.5, filed on Aug. 30, 2012, the entire contents of which are incorporated by reference herein.

FIELD OF THE INVENTION

The present invention generally relates to computer network technologies and, more particularly, to information displaying methods and apparatus.

BACKGROUND

With the rapid development of 3G wireless technologies, applications of 3G wireless technologies are becoming more and more popular. Hardware configurations for terminal devices, i.e. mobile phones, tablet personal computers, have become more advanced. Smartphones are widely used and mobile phones are playing an increasingly important role in our daily life. As a result, mobile applications are more abundant than ever before. A user can freely choose his/her favorite applications when using a mobile phone, just like using a computer. Among various mobile applications, a browser is a very important application because the browser can retrieve, present and traverse information resources on the World Wide Web, allowing users to learn about the world. A good browser enables users to access a variety of information more easily.

A start page of the browser, as an entry of the browser, is the first page that appears upon opening a web browser program, which can be a website or a page with various browser functions such as the visual display of websites that are often visited in the web browser. Modern browser start page can display functions in a multi-screen mode, a single-screen mode, or a tab mode. Some start pages may have various functions, but several of these functions are not used frequently; some start pages may have intensive layout which is not convenient for the user to find and click; and some start pages may require complex operations, making it difficult for the user to learn.

The disclosed method and apparatus are directed to solve one or more problems set forth above and other problems.

BRIEF SUMMARY OF THE DISCLOSURE

One aspect of the present disclosure includes a method for displaying information. When a terminal receives a request for starting a browser, the terminal obtains quick links and web applications that are cached in local database of the terminal and displays the obtained quick links by combinations of webpage icons and webpage titles in a middle screen display interface of a start page of the browser for the requester. When receiving a request for switching display interfaces of the start page of the browser, the terminal displays a search box in the start page of the browser or the obtained web applications by combinations of application icons and application titles in the start page of the browser.

Another aspect of the present disclosure includes an information displaying apparatus. The information displaying apparatus includes a receiving module, an obtaining module, and a display module. The receiving module is configured to receive a request for starting a browser and a request for switching display interfaces of a start page of a browser. The obtaining module is configured to, when the receiving module receives a request for starting the browser, obtain quick links and web applications that are cached in local database of the terminal. The display module is configured to, when the receiving module receives a request for starting the browser, display the obtained quick links by combinations of webpage icons and webpage titles in a middle screen display interface of a start page of the browser. The display module is also configured to, when the receiving module receives the request for switching the display interfaces of the start page of the browser, display a search box in the start page of the browser or the web applications by combinations of application icons and application titles in the start page of the browser.

Other aspects of the present disclosure can be understood by those skilled in the art in light of the description, the claims, and the drawings of the present disclosure.

BRIEF DESCRIPTION OF THE DRAWINGS

The exemplary embodiments of the present invention are described in detail by referring to the accompanying drawings, such that those skilled in the art can understand the features and advantages of the present invention. In the accompanying drawings.

DETAILED DESCRIPTION

Reference will now be made in detail to exemplary embodiments of the invention, which are illustrated in the accompanying drawings.

Figure 5:
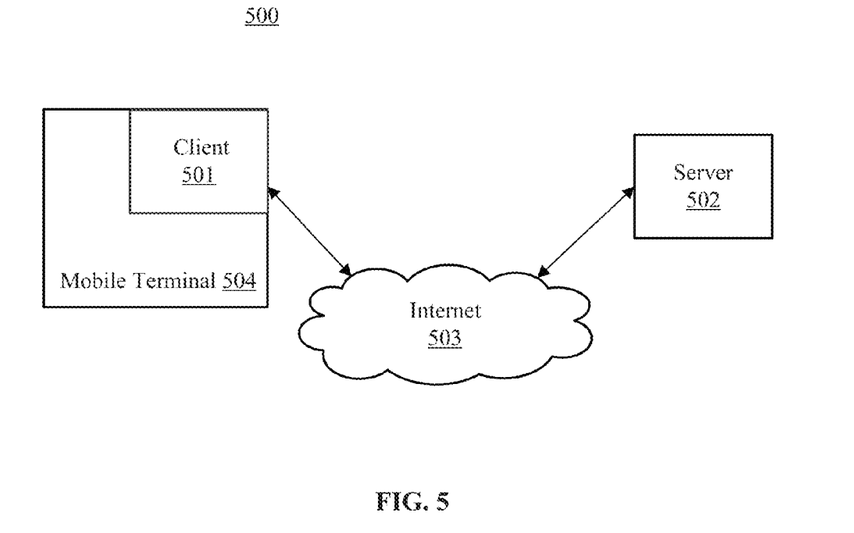
FIG. 5 illustrates an exemplary operating environment incorporating certain disclosed embodiments.

FIG. 5 illustrates an exemplary operating environment 500 incorporating certain disclosed embodiments. As shown in FIG. 5, environment 500 may include a mobile terminal 504, the Internet 503, and a server 502. The Internet 503 may include any appropriate type of communication network for providing network connections to the mobile terminal 504 and the server 502 or among multiple terminals 504 and servers 502. For example, Internet 503 may include the Internet or other types of computer networks or telecommunication networks, either wired or wireless.

A server, as used herein, may refer to one or more server computers configured to provide certain web server functionalities to provide certain personalized services, which may require any user accessing the services to authenticate to the server before the access. A web server may also include one or more processors to execute computer programs in parallel.

The server 502 may include any appropriate server computers configured to provide certain server functionalities, such as web server functionality for responding a user's request for web page operations or other application server. Although only one server is shown, any number of servers 502 can be included. The server 502 may be operated in a cloud or non-cloud computing environment.

Mobile terminal 504 may include any appropriate type of mobile computing device, such as a mobile phone, a smart phone, a tablet, a notebook computer, or any type of mobile computing platform. Mobile terminal 504 may include one or more clients 501. The client 501, as used herein, may include any appropriate mobile application software, hardware, or a combination of application software and hardware to achieve certain client functionalities. For example, client 501 may include a browser, etc. According to actual needs in different terminals, a mobile client may be a browser installed on the terminal for browsing, including various types of existing and future browser installed on mobile terminals. Although only one client 501 is shown in the environment 500, any number of clients 501 may be included.

Figure 6:
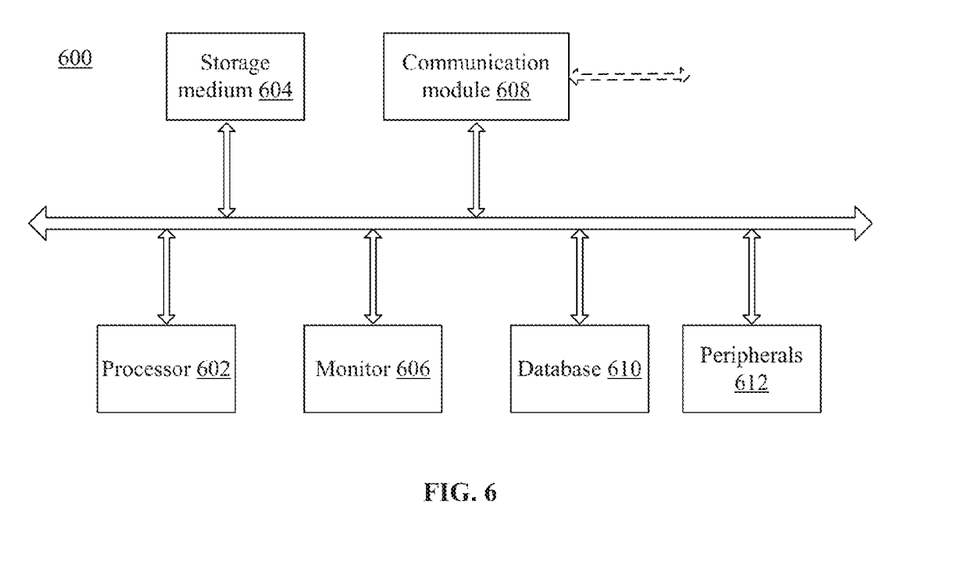
FIG. 6 illustrates a block diagram of an exemplary computer system consistent with the disclosed embodiments.

Mobile terminal 504, client 501, and/or server 502 may be implemented on any appropriate computing platform. FIG. 6 illustrates a block diagram of an exemplary computer system 600 capable of implementing mobile terminal 504, client 501, and/or server 502.

As shown in FIG. 6, computer system 600 may include a processor 602, a storage medium 604, a monitor 606, a communication module 608, a database 610, and peripherals 612. Certain devices may be omitted and other devices may be included.

Processor 602 may include any appropriate processor or processors. Further, processor 602 can include multiple cores for multi-thread or parallel processing. Storage medium 604 may include memory modules, such as ROM, RAM, flash memory modules, and erasable and rewritable memory, and mass storages, such as CD-ROM, U-disk, and hard disk, etc. Storage medium 604 may store computer programs for implementing various processes, when executed by processor 602.

Further, peripherals 612 may include I/O devices such as keyboard and mouse, and communication module 608 may include network devices for establishing connections through the communication network. Database 610 may include one or more databases for storing certain data and for performing certain operations on the stored data, such as database searching.

In operation, client 501 and server 502 may interact with each other to provide a web browsing service to the user(s) of the client 501. Because a mobile browser often has a limited display area, general computer-based browser technology may be unsuitable for the mobile browser.

When starting a mobile browser on a terminal, a start page of a mobile browser may be divided into 3 screens: a middle screen, a left screen, and a right screen. The middle screen displays webpage quick links preset by the browser or/and webpage quick links added by a user. The left screen is a search interface that includes popular search keywords and a search box. The right screen displays web applications preset by the browser or/and web applications added by the user.

In order to display the quick links and the web applications more clearly, the middle screen displays quick links by combinations of webpage icons and webpage titles; and the right screen displays web applications by combinations of application icons and application titles.

Figure 1:
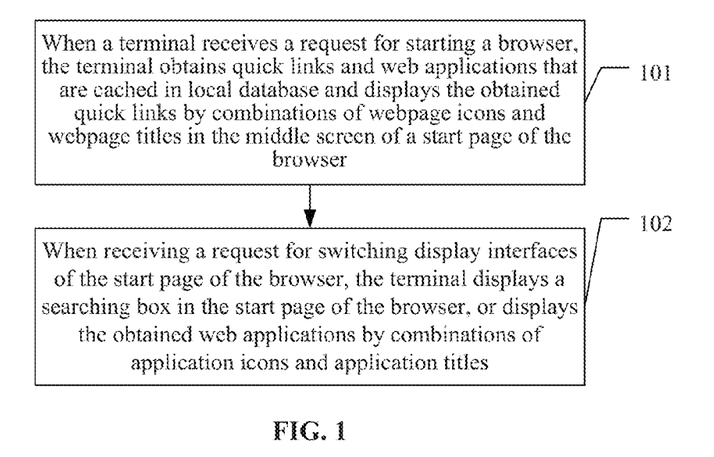
FIG. 1 illustrates a flow diagram of an exemplary information displaying method consistent with the disclosed embodiments.

FIG. 1 illustrates a flow diagram of an exemplary information displaying method consistent with the disclosed embodiments. As shown in FIG. 1, the method includes the following steps:

Step 101: when a terminal receives a request for starting a browser, the terminal obtains quick links and web applications that are cached in local database and displays the obtained quick links by combinations of webpage icons and webpage titles in the middle screen of a start page of the browser for the requester.

Specifically, when the user installs the browser in the terminal and adds the quick links or/and the web applications in the browser, the terminal caches locally the quick links or/and the web applications of the browser. When the user initially installs the browser, the quick links and web applications that are cached in the local database are preset quick links and web applications of the browser.

When the terminal receives the request for starting the browser (for example, the user clicks the browser icon to start the browser), the terminal obtains quick links and web applications that are cached in the local database and displays the obtained quick links by the combinations of webpage icons and webpage titles in the middle screen of a start page for the requester.

Further, the quick link may be added in the browser according to the user's needs. Specifically, when the terminal receives a request for adding a quick link, the terminal may display a quick link addition page for the requester. The information displayed on the quick link addition page may include preset recommended websites (e.g., Baidu, Google, Taobao, etc.), locally cached browsing history, or one or more locally cached bookmarks. In addition, the page may also provide an address input box. The user may input a web address corresponding to the quick link that the user wants to add in the address box.

Accordingly, the quick link that is requested to be added may be a link corresponding to a preset recommended website, a link corresponding to locally cached browsing history, a link corresponding to a locally cached bookmark, or/and a link corresponding to a web address input by the user. The terminal may display the quick link requested to be added by a combination of a webpage icon and a webpage title in the middle screen of the start page of the browser based on the quick link requested to be added, and add information about the quick link requested to be added in the local database.

Corresponding to adding the quick link in the browser, the user may also delete an existing quick link in the browser. Specifically, when receiving a request for deleting an existing quick link, the terminal may delete the webpage icon and the webpage title corresponding to the quick link that is requested to be deleted from the middle screen of the start page of the browser. The terminal also deletes information cached in the local database about the quick link that is requested to be deleted.

Step 102: when receiving a request for switching display interfaces of the start page of the browser, the terminal displays a search box in the start page of the browser, or displays the obtained web applications by combinations of application icons and application titles.

As used herein, when the terminal receives a request for switching the display interface of the start page of the browser, the detailed process flow has the following two situations.

Situation 1: when the terminal receives a request for switching to the display interface of the left screen of the start page of the browser, the search box is displayed in the display interface of the left screen of the start page of the browser; when the terminal receives a request for switching to the display interface of right screen of the start page of the browser, the web applications are displayed by the combinations of the application icons and the application titles in the display interface of the right screen of the start page of the browser.

Situation 2: when the terminal receives a request for switching to the display interface of the left screen of the start page of the browser, the web applications are displayed by the combinations of the application icons and the application titles in the display interface of the left screen of the start page of the browser; when the terminal receives a request for switching to the display interface of the right screen of the start page of the browser, the search box is displayed in the display interface of the right screen of the start page of the browser.

According to Situation 1, when the terminal receives a request for switching to the display interface of the left screen of the start page of the browser, the search box is displayed in the display interface of the left screen of the start page of the browser.

The left screen of the start page of the browser is the search interface. When the terminal receives a request for switching to the display interface of the left screen of the start page of the browser (for example, a user slides a finger to the right on the screen of a touch screen mobile phone), the search box is displayed to the requester.

Further, in order to improve the search efficiency, popular search keywords may also be displayed in the display interface which displays the search box of the start page of the browser. Accordingly, the browser may obtain the newest popular search keywords through the terminal from the server and cache the obtained popular search keywords in the local database.

After the operating time period of the browser meets a preset condition (for example, every 30 minutes after the browser starts), the terminal may send a request for obtaining the popular search keywords to the server, and update the popular search keywords displayed in the display interface of the left screen of the start page of the browser and cached in the local database based on the obtained popular search keywords. In addition, the terminal may also send a request for obtaining the popular search keywords to the server when receiving a request for updating the popular search keywords (for example, the user clicks the update button of the left screen), and update the popular search keywords displayed in the display interface of the left screen of the start page of the browser and cached in the local database based on the obtained popular search keywords.

Further, search category options may also be displayed in the display interface that displays the search box of the start page of the browser. Accordingly, when the browser receives a search request, the browser may perform a search operation based on the selected search category (for example, websites, stories and music) and search keywords included in the search request. The search keywords may be keywords entered by manual input (for example, the user may type the keywords in the search box) or voice input (for example, the user may submit a search request by voice).

When the terminal receives a request for switching to the display interface of the right screen of the start page of the browser, the obtained web applications are displayed by the combinations of the application icons and the application titles to the requester.

The web applications that are preset by the browser or/and added by the user are displayed in the display interface of the right screen of the start page of the browser. When the terminal receives a request for switching to the display interface of the right screen of the start page of the browser (for example, a user slides a finger to the left on the screen of a touch screen mobile phone), the obtained web applications are displayed by the combinations of the application icons and the application titles to the requester.

Further, when the server detects that the browser is installed on the terminal, the server may generate a unique identification for the terminal. Corresponding to the unique identification, the server records the web applications included in the browser which is installed on the terminal. The unique identification may be generated by the server based on time when installing the browser on the terminal, terminal identity information (e.g., International Mobile Equipment Identity of a mobile terminal, and communication number of mobile communication terminal Equipment, etc.). The detailed implementation is omitted herein.

Further, the web applications may be added in the browser based on the user's needs. Specifically, when the terminal receives a request for adding a web application, the terminal may display a web application addition page by communicating with the server (optional web applications provided by the server are displayed in the web application addition page) for the requester. The terminal may add the web applications to the display interface of the right screen by the combinations of the application icons and the application titles based on the request for adding the web application, and cache the added web application information in the local database.

In addition, the existing web applications in the browser may also be deleted. When the terminal receives a request for deleting a web application, the terminal may delete the application icon and the application title corresponding to the web application that is requested to be deleted from the display interface of the right screen, and delete the locally cached web application information that is requested to be deleted.

Accordingly, the server may also update the recorded web application information corresponding to the unique identification of the terminal including the browser based on additions and deletions of the web application in the browser.

The server may also record login information of the web application in the terminal corresponding to the unique identification of the terminal, improving the user's using efficiency for the corresponding web application. The web applications may be developed using HTML5 or JavaScript, etc.

Figure 2A:
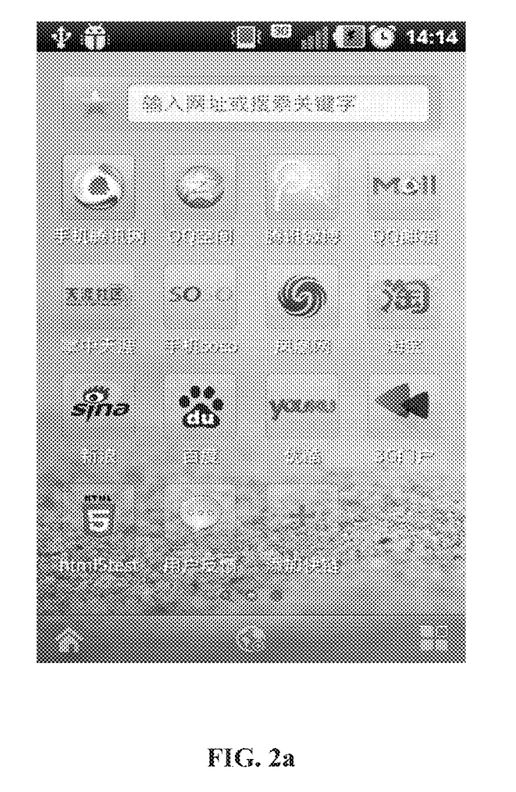
FIGS. 2a, 2b and 2c illustrate schematic diagrams of exemplary middle screen, left screen and right screen of the browser consistent with the disclosed embodiments.
Figure 2B:
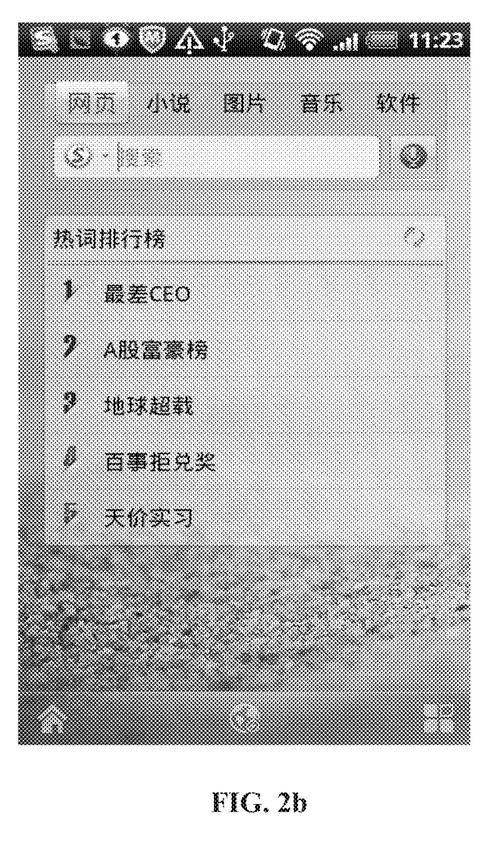
Figure 2C:
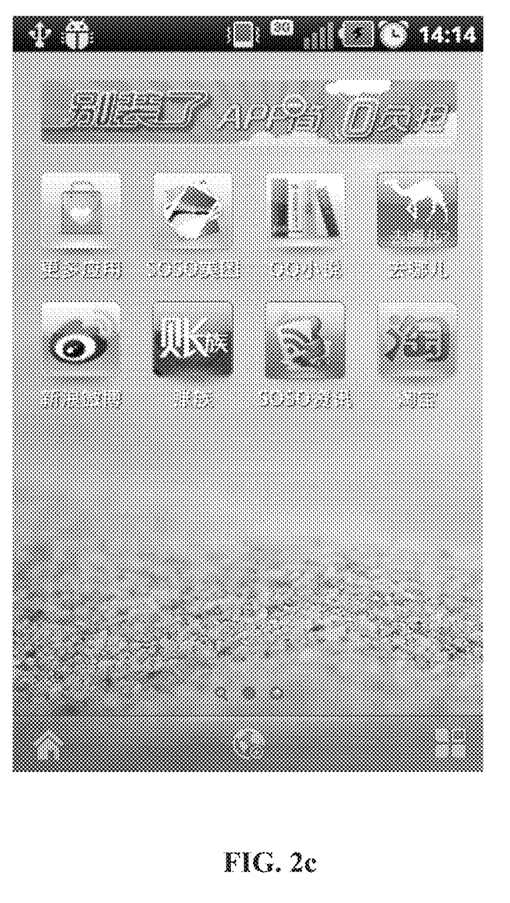

FIGS. 2a, 2b and 2c illustrate schematic diagrams of exemplary middle screen, left screen and right screen of the browser consistent with the disclosed embodiments.

As shown in FIG. 2a, the middle screen of the start page of the browser displays quick links preset by the browser or/and added by the user by combinations of webpage icons and webpage titles. To make a clicking operation more convenient for a user to select the corresponding quick link, the number of quick links displayed in the middle screen of the start page of the browser cannot be greater than a preset threshold number (the preset threshold number is 16 in FIG. 2a).

As shown in FIG. 2b, the left screen of the start page of the browser is a search page. The upper part of the left screen includes the search input field. The user may select search categories (e.g., webpages, stories, images, music, software, etc.) or search engines (e.g., SOSO, Baidu, Google, etc.). Search keywords are entered through manual input or voice input. The lower part of the left screen is the rank of popular search keywords (FIG. 2b only shows the top 5 search keywords).

As shown in FIG. 2c, the right screen of the start page of the browser displays web applications preset by the browser or/and added by the user by combinations of application icons and application titles. To make a clicking operation more convenient for a user to select the corresponding quick link, the number of web applications displayed in the right screen of the start page of the browser cannot be greater than a preset threshold number (the preset threshold number is 16 in FIG. 2c).

The quick links included in the browser, the web applications, and the popular search keywords displayed on the left screen of the start page of the browser when the browser is closed last time are cached in the mobile phone (terminal).

When the mobile phone receives a request for starting the browser (for example, the user clicks the browser icon on the mobile phone screen), the mobile phone may obtain the quick links included in the browser, the web applications and the popular search keywords cached in the local database. The obtained quick links are displayed to the user in the middle screen of the start page of the browser by the combinations of the webpage icons and the webpage titles.

Figure 3A:
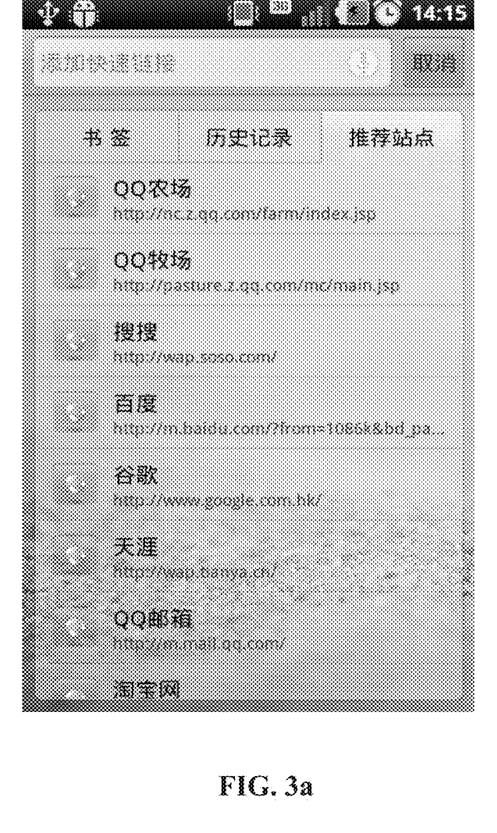
FIG. 3a illustrates a schematic diagram of an exemplary quick link addition page consistent with the disclosed embodiments.
Figure 3B:
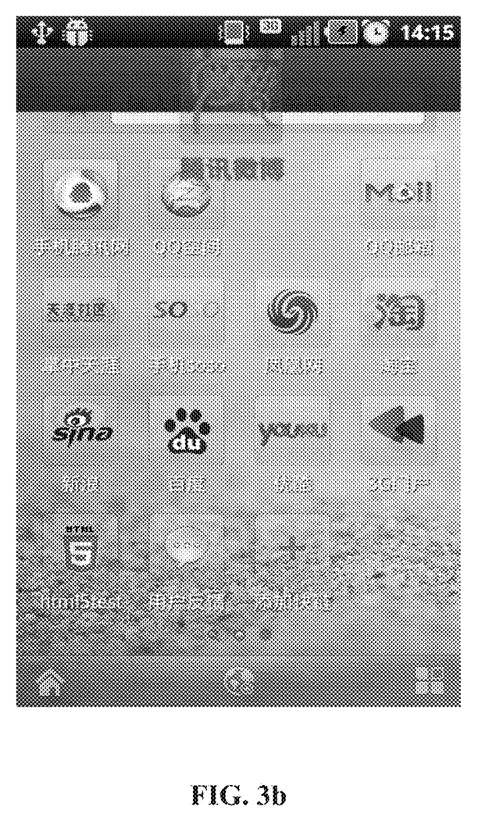
FIG. 3b illustrates a schematic diagram of an exemplary quick link deletion page consistent with the disclosed embodiments.

Referring to FIG. 2a, when the user wants to add a quick link, the user may click adding quick links button on the screen (i.e., '+' icon) to submit a request for adding a quick link. When the mobile phone receives the request for adding a quick link from the user, the mobile phone displays a quick link addition page to the user. FIGS. 3a and 3b show exemplary quick link page operations.

FIG. 3a illustrates a schematic diagram of an exemplary quick link addition page consistent with the disclosed embodiment. As shown in FIG. 3a, a quick link addition page includes recommended websites, browsing history, bookmarks and an input box of the quick links. The user may select a web address to add in the middle screen of the browser from the recommended websites, the browsing history cached in the local database and the bookmarks cached in the local database. The user may also input a web address of the quick link that he/she wants to add in the address input box, adding corresponding quick link in the display interface of the middle screen.

FIG. 3b illustrates a schematic diagram of an exemplary quick link deletion page consistent with the disclosed embodiment. As shown in FIG. 3b, when the user wants to delete an existing quick link from the middle screen, the user may keep pressing the existing quick link that needs to be deleted until a 'recycle bin' icon (e.g., a trash can) is displayed on the screen. Then, the user may drag the quick link that needs to be deleted into the recycle bin, deleting the quick link.

When the mobile phone receives a request for switching to the left screen of the start page of the browser (for example, the current screen displayed on the mobile phone is the middle screen of the start page of the browser, and the user slides a finger to the right on the screen), the mobile phone displays the obtained cached popular search keywords to the user (referring to FIG. 2b).

After the browser is started, the browser may send periodically a request for obtaining the popular search keywords to the server, and update the popular search keywords displayed in the display interface of the left screen and the popular search keywords cached in the local database based on the obtained popular search keywords. In addition, the user may also manually trigger the update of the popular search keywords by clicking the refresh button of the search interface. When the mobile phone receives a request for refreshing (updating) the popular search keywords, the mobile phone may send a request for obtaining the popular search keywords to the server, and update the popular search keywords displayed in the display interface of the left screen and the popular search keywords cached in the local database based on the obtained popular search keywords.

When the mobile phone receives a request for switching to the right screen of the start page of the browser (for example, the current screen displayed on the mobile phone is the middle screen of the start page of the browser, and the user slides a finger to the left on the screen), the mobile phone displays the obtained web applications to the user (referring to FIG. 2c).

Referring to FIG. 2c, when the user wants to add a web application, the user may click the 'more applications' icon on the screen to submit a request for adding the web application. When the mobile phone receives the request for adding the web application from the user, the mobile phone may obtain the web application information from the server by communicating with the server and display the web application addition page for the user. The user selects the web application that needs to be added and adds the web application to the web application addition page.

The operations that delete a web application are similar to the operations that delete a quick link, which are not repeated herein.

Further, when the user installs the browser on the mobile phone, the server may generate a unique identification for the mobile phone based on the time when the browser is installed on the terminal and a phone number of the mobile phone, and record web applications included in the browser installed on the mobile phone corresponding to the unique identification.

Figure 4:
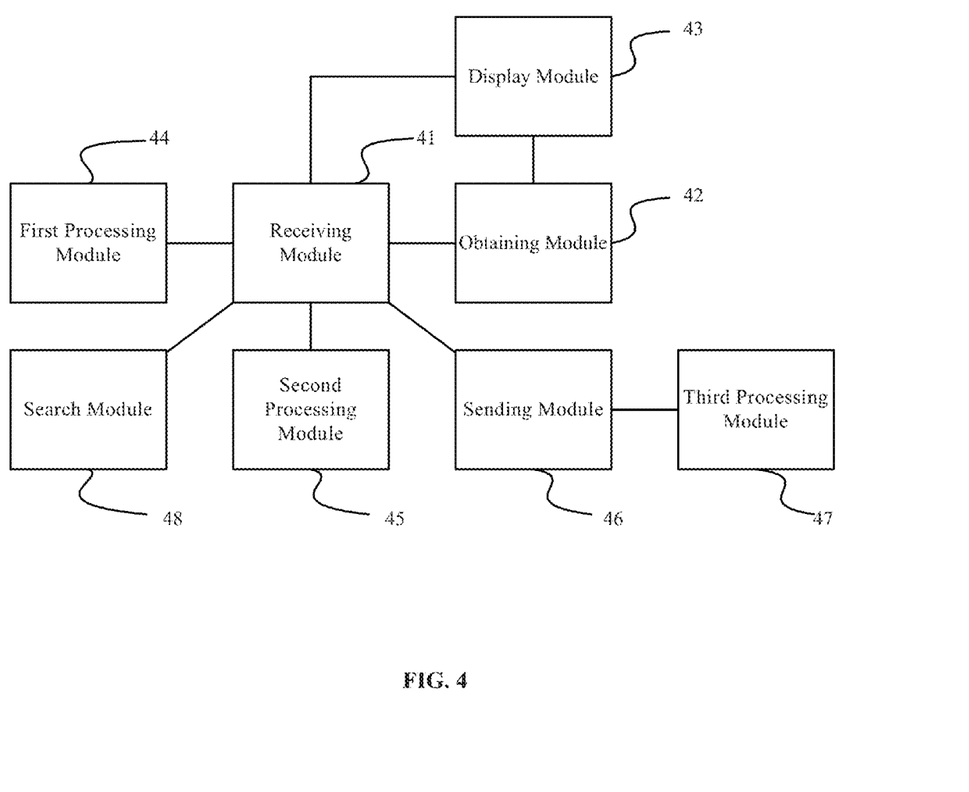
FIG. 4 illustrates a structure diagram of an exemplary information displaying apparatus consistent with the disclosed embodiments.

A terminal apparatus for displaying information for performing the above described methods may also be provided. FIG. 4 illustrates a structure diagram of an exemplary information displaying apparatus consistent with the disclosed embodiments.

As shown in FIG. 4, the information displaying apparatus includes a receiving module 41, an obtaining module 42, and a display module 43. Other components may also be included.

The receiving module 41 is configured to receive a request for starting a browser or a request for switching display interfaces of a start page of a browser. The obtaining module 42 is configured to, when the receiving module 41 receives a request for starting the browser, obtain quick links and web applications that are cached in local database.

The display module 43 is configured to, when the receiving module 41 receives a request for starting the browser, display the obtained quick links by combinations of webpage icons and webpage titles in the display interface of the middle screen of a start page of the browser. The display module 43 is also configured to, when the receiving module 41 receives the request for switching the display interfaces of the start page of the browser, display a search box in the display interface of the start page of the browser, or display the web applications by the combinations of the application icons and the application titles.

Further, the display module 43 is configured to, when the receiving module 41 receives a request for switching to the display interface of the left screen of the start page of the browser, display the search box in the display interface of the left screen of the start page of the browser. When the receiving module 41 receives a request for switching to the display interface of the right screen of the start page of the browser, the display module 43 displays the web applications by the combinations of the application icons and the application titles in the display interface of the right screen of the start page of the browser.

Alternatively or additionally, the display module 43 is configured to, when the receiving module 41 receives a request for switching to the display interface of the left screen of the start page of the browser, display the web applications by the combinations of the application icons and the application titles in the display interface of the left screen of the start page of the browser. When the receiving module 41 receives a request for switching to the display interface of the right screen of the start page of the browser, the display module 43 displays the search box in the display interface of the right screen of the start page of the browser.

The obtaining module 42 is also configured to, when the receiving module 41 receives a request for starting the browser, obtain popular search keywords that are cached in the local database.

Accordingly, the display module 43 can also be configured to, when the receiving module 41 receives the request for switching the display interfaces of the start page of the browser, display the popular search keywords in the display interface of the search box displayed in the start page of the browser.

Further, the receiving module 41 is also configured to receive a request for adding a quick link or a request for deleting a quick link. The display module 43 is also configured to, when the receiving module 41 receives a request for adding a quick link, display a quick link addition page for the requester.

In addition, the terminal may also include a first processing module 44 and a second processing module 45. The first processing module 44 is configured to, when the receiving module 41 receives a request for adding a quick link, add the quick link requested to be added by a combination of a webpage icon and a webpage title in the display interface of the middle screen of the start page of the browser, and to add information about the quick link requested to be added in the local database.

When the receiving module 41 receives a request for deleting an existing quick link, the first processing module 44 is configured to delete the webpage icon and the webpage title corresponding to the quick link that is requested to be deleted from the middle screen of the start page of the browser, and to delete information about the quick link that is cached in the local database.

The quick link addition page may include preset recommended websites, browsing history, bookmarks and/or an address input box. The quick link requested to be added includes a link corresponding to a preset recommended website, a link corresponding to the locally cached browsing history, a link corresponding to the locally cached bookmark and/or a link corresponding to the address input by the user.

The receiving module 41 is also configured to receive a request for adding web applications or a request for deleting web applications.

The display module 43 is also configured to, when the receiving module 41 receives a request for adding a web application, display web application addition page for the requester.

The second processing module 45 is configured to, when the receiving module 41 receives a request for adding a web application, add the web application requested to be added by a combination of an application icon and an application title in the display interface of the right screen of the start page of the browser, and to add information about the web application requested to be added in the local database.

When the receiving module 41 receives a request for deleting an existing web application, the second processing module 45 deletes the web application requested to be deleted from the right screen of the start page of the browser, and deletes information about the web application that is cached in the local database.

Further, when the server detects that the browser is installed on the terminal, the server generates a unique identification for the terminal. The unique identification records web application information included in the right screen of the start page of the browser.

In addition, the terminal may also include a sending module 46, a third processing module 47, and a search module 48. The sending module 46 is configured to send a request for obtaining the popular search keywords to the server when the operating period of the browser meets a preset condition or when the receiving module 41 receives a request for updating the popular search keywords.

The third processing module 47 is configured to update the popular search keywords in the display interface of the start page of the browser and the popular search keywords cached in the local database based on the obtained popular search keywords. The display module 43 is also configured to display search category options in the display interface that displays the search box of the start page of the browser.

The search module 48 is configured to, when the receiving module 41 receives a search request, perform a search operation based on the selected search category and search keywords included in the search request. The search keywords are keywords entered by manual input or voice input.

Based on the above-description of the implementations, those skilled in the art may clearly understand that the embodiments may be implemented by software plus a necessary common hardware platform or by hardware. For example, the implementations may be in the form of a computer software program or computer software product. The computer software product is stored in a storage medium (e.g., read only memory, a magnetic disk, a Compact Disc, etc.) and includes several codes to make a computer device (such as a personal computer, a server or a network device) perform the method in embodiments of the present invention.

Those skilled in the art may understand that the modules in the apparatus of the embodiments disclosed herein may be distributed in the apparatus of the embodiments according to the descriptions of the embodiments, and may also be varied to be located in one or more apparatuses different from those of the embodiments. The modules of the above embodiments may be integrated into one module or may be further divided into multiple sub-modules.

The embodiments disclosed herein are exemplary only and not limiting the scope of this disclosure. Without departing from the spirit and scope of this invention, other modifications, equivalents, or improvements to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

By using the disclosed methods and apparatus for displaying information, when a terminal receives a request for starting a browser, the terminal obtains quick links and web applications that are cached in local database of the terminal and displays the obtained quick links by combinations of webpage icons and webpage titles in a middle screen display interface of a start page of the browser for the requester. When receiving a request for switching display interfaces of the start page of the browser, the terminal displays a search box in the start page of the browser or the obtained web applications by combinations of application icons and application titles in the start page of the browser, improving the user's using efficiency.

What is claimed is:

1. A method for displaying information of a terminal coupled to a server, comprising:
   receiving, by the terminal including at least a processor, a request for starting a browser;
   obtaining, by the terminal, quick links and web applications that are cached in local database of the terminal;
   displaying, by the terminal, the obtained quick links by combinations of webpage icons and webpage titles in a middle screen display interface of a start page of the browser, wherein the start page of the browser includes multiple display interfaces;
   receiving, by the terminal, a request for switching display interfaces of the start page of the browser, wherein the browser is configured to display one display interface of the start page at a time; and
   displaying, by the terminal in response to the request for switching display interfaces, a search box in the start page of the browser or the obtained web applications by combinations of application icons and application titles in the start page of the browser;
   wherein displaying a search box in the start page of the browser or the obtained web applications by combinations of application icons and application titles in the start page of the browser further includes:
   when receiving a request for switching the display interfaces to a left screen display interface of the start page of the browser, displaying the search box or the web applications by the combinations of the application icons and the application titles on the left screen of the start page of the browser; and
   when receiving a request for switching the display interfaces to a right screen display interface of the start page of the browser, displaying the search box or the web applications by the combinations of the application icons and the application titles on the right screen of the start page of the browser.

2. The method according to claim 1, further including:
   when receiving the request for switching the display interfaces of the start page of the browser, displaying popular search keywords on a left screen display interface of the start page of the browser which displays the search box.

3. The method according to claim 2, further including:
   sending a request for obtaining the popular search keywords to the server when an operating time period of the browser meets a preset condition;
   sending a request for obtaining the popular search keywords to the server when receiving a request for updating the popular search keywords; and
   displaying search category options on the left screen of the start page of the browser which displays the search box.

4. The method according to claim 1, further including:
   receiving a request for adding a quick link;
   displaying a quick link addition page;
   adding a quick link requested to be added by a combination of a webpage icon and a webpage title on the middle screen of the start page of the browser;
   adding information about the quick link requested to be added in the local database;
   receiving a request for deleting an existing quick link;
   deleting the webpage icon and the webpage title corresponding to the quick link that is requested to be deleted from the middle screen of the start page of the browser; and
   deleting information about the quick link requested to be deleted that is cached in the local database.

5. The method according to claim 4, wherein:
   the quick link addition page includes preset recommended websites, browsing history, bookmarks and an address input box; and
   the quick link requested to be added includes at least one of a link corresponding to a preset recommended website, a link corresponding to the locally cached browsing history, a link corresponding to the locally cached bookmark and a link corresponding to the address input by the user.

6. The method according to claim 1, further including:
   receiving a request for adding a web application;
   displaying a web application addition page;
   adding the web application requested to be added by a combination of an application icon and an application title on a right screen display interface of the start page;
   adding information about the web application requested to be added in the local database;
   receiving a request for deleting a web application;
   deleting the web application that is requested to be deleted from the right screen of the start page of the browser; and
   deleting information about the web application cached in the local database.

7. The method according to claim 6, wherein:
   when the server detects that the browser is installed on the terminal, the server generates a unique identification for the terminal; and
   the unique identification is used to record web application information included in the right screen of the start page of the browser.

8. The method according to claim 6, wherein the web applications are developed using HTML5 and JavaScript.

9. The method according to claim 1, wherein displaying search category options on the left screen of the start page of the browser which displays the search box further includes:
   receiving a search request; and performing a search operation based on the selected search category and search keywords included in the search request, wherein the search keywords are entered by manual input or voice input.

10. An apparatus including at least one processor for displaying information, comprising:
a receiving module configured to receive a request for starting a browser;
an obtaining module configured to, when the receiving module receives the request for starting the browser, obtain quick links and web applications that are cached in local database of the terminal; and
a display module configured to display the obtained quick links by combinations of webpage icons and webpage titles in a middle screen display interface of a start page of the browser, wherein the start page of the browser includes multiple display interfaces, and the display module is configured to display one display interface of the start page at a time;
wherein:
the receiving module is further configured to receive a request for switching display interfaces of the start page of the browser; and
the display module is further configured to, when the receiving module receives the request for switching the display interfaces of the start page of the browser, display a search box in the start page of the browser or the web applications by combinations of application icons and application titles in the start page of the browser;
wherein, the display module is further configured to:
when the receiving module receives a request for switching the display interfaces to a left screen display interface of the start page of the browser, display the search box or the web applications by the combinations of the application icons and the application titles on the left screen of the start page of the browser; and
when the receiving module receives a request for switching the display interfaces to a right screen display interface of the start page of the browser, display the search box or the web applications by the combinations of the application icons and the application titles on the right screen of the start page of the browser.

11. The apparatus according to claim 10, wherein:
the obtaining module is further configured to, when the receiving module receives a request for starting the browser, obtain popular search keywords that are cached in the local database of the terminal; and
the display module is further configured to, when the receiving module receives the request for switching the display interfaces of the start page of the browser, display the popular search keywords on a left screen display interface of the start page of the browser which displays the search box.

12. The apparatus according to claim 11, further including:
a sending module configured to send a request for obtaining the popular search keywords to the server when an operating time period of the browser meets a preset condition and when the receiving module receives a request for updating the popular search keywords; and
a third processing module configured to update the popular search keywords in the display interface of the start page of the browser and the popular search keywords cached in the local database based on the obtained popular search keywords.

13. The apparatus according to claim 10, wherein the receiving module is further configured to receive a request for adding a quick link and a request for deleting a quick link, and the display module is further configured to display a quick link addition page for the requester, and the apparatus further includes:
a first processing module configured to:
when the receiving module receives a request for adding a quick link, add a quick link requested to be added by a combination of a webpage icon and a webpage title on the middle screen of the start page of the browser, and to add information about the quick link requested to be added in the local database; and
when the receiving module receives a request for deleting an existing quick link, delete the webpage icon and the webpage title corresponding to the quick link that is requested to be deleted from the middle screen of the start page of the browser, and to delete information about the quick link that is cached in the local database.

14. The apparatus according to claim 13, wherein:
the quick link addition page includes at least one of preset recommended websites, browsing history, bookmarks and an address input box; and
the quick link requested to be added includes as least one of a link corresponding to a preset recommended website, a link corresponding to the locally cached browsing history, a link corresponding to the locally cached bookmark and a link corresponding to the address input by the user.

15. The apparatus according to claim 10, wherein the receiving module is configured to receive a request from a requester for adding web applications and a request for deleting existing web applications and the display module is configured to display a web application addition page for the requester, and apparatus further includes:
a second processing module configured to:
when the receiving module receives a request from a requester for adding a web application, add the web application requested to be added by a combination of an application icon and an application title on a right screen display interface of the start page of the browser, and to add information about the web application requested to be added in the local database; and
when the receiving module receives a request from a requester for deleting an existing web application, delete the web application requested to be deleted from the right screen of the start page of the browser, and to delete information about web application that is cached in the local database.

16. The apparatus according to claim 15, wherein:
when a server detects that the browser is installed on the terminal, the server generates a unique identification for the terminal; and
the unique identification is used to record web application information and login information thereof included in the right screen of the start page of the browser.

17. The apparatus according to claim 10, wherein the display module is configured to display search category options on the left screen of the start page of the browser which displays the search box, and the apparatus further includes:
a search module configured to, when the receiving module receives a search request from a requester, perform a search operation based on the selected search category and search keywords included in the search request, wherein the search keywords are entered by manual input or voice input.

18. The method according to claim 1, wherein:

the start page of the browser includes the middle screen display interface for displaying the combinations of the webpage icons and the webpage titles, a left screen display interface for displaying the search box, and a right screen display interface for displaying the combinations of the application icons and the application titles; and the request for switching display interfaces of the start page of the browser is a request for switching from the middle screen display interface to the left screen display interface, or to the right screen interface.

* * * * *